United States Patent [19]

Szemeredi et al.

[11] 4,335,853

[45] Jun. 22, 1982

[54] MOTION TRANSMISSION DEVICE

[75] Inventors: Robert S. Szemeredi, Sunland; Edward M. Troup, Mt. Baldy, both of Calif.

[73] Assignee: Lyntone Engineering, Inc., Glendora, Calif.

[21] Appl. No.: 144,433

[22] Filed: Apr. 28, 1980

[51] Int. Cl.[3] ......................... B05B 3/04; F16H 27/02

[52] U.S. Cl. ....................................... 239/239; 74/129

[58] Field of Search ............... 239/225, 237, 239, 263; 74/128, 129

[56] References Cited

U.S. PATENT DOCUMENTS

| | | |
|---|---|---|
| 25,550 | 9/1859 | Underhill . |
| 557,415 | 3/1896 | McDonald . |
| 662,611 | 11/1900 | Walker . |
| 1,171,763 | 2/1916 | Allen . |
| 1,243,199 | 10/1917 | Miller . |
| 1,316,437 | 9/1919 | Flood . |
| 2,084,585 | 6/1937 | Keith .................................. 239/239 |
| 2,821,861 | 2/1958 | Dunn ....................................... 74/30 |
| 3,233,472 | 2/1966 | Canalizo et al. ......................... 74/30 |
| 3,779,092 | 12/1973 | Bode ................................ 74/128 X |
| 3,789,681 | 2/1974 | Mitsui et al. ...................... 74/128 X |
| 3,924,476 | 12/1975 | Wolcott ................................. 74/30 |
| 4,270,399 | 6/1981 | Knief .................................... 74/129 |

*Primary Examiner*—Andres Kashnikow
*Attorney, Agent, or Firm*—Fulwider, Patton, Reiber, Lee & Utecht

[57] ABSTRACT

A linear to rotary motion transmission device comprises a reciprocal rack having a plurality of ratchet teeth engageable with flexible pawls of a rotary pinion. Reciprocation of the rack in one direction causes driving engagement between the pawls and the teeth for rotatably driving the pinion, and reciprocation of the rack in an opposite direction causes the flexible pawls to slide over the ratchet teeth in non-driving engagement.

27 Claims, 4 Drawing Figures

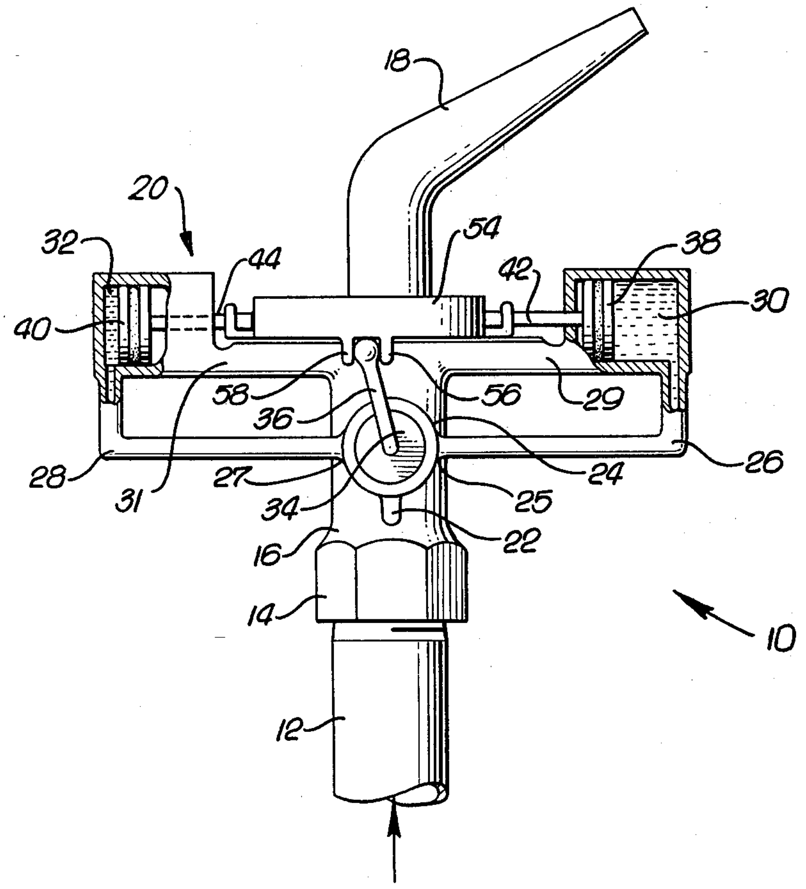
FIG. 1.
FIG. 2.
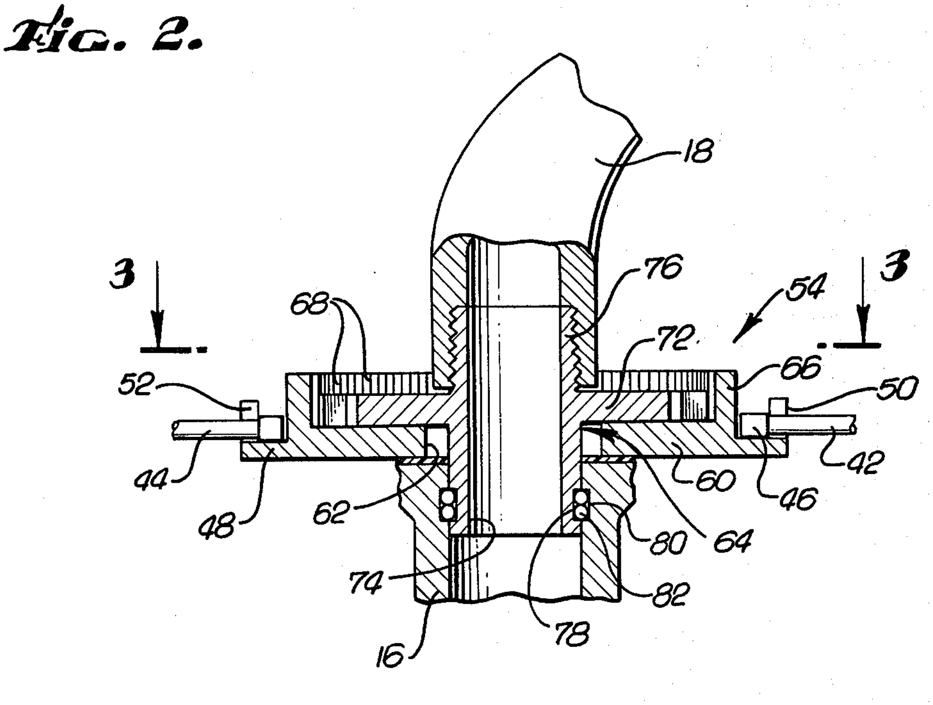

MOTION TRANSMISSION DEVICE

BACKGROUND OF THE INVENTION

This invention relates to an improved linear to rotary motion transmission device. More specifically, this invention relates to a simple, inexpensive device for converting a reciprocating linear input to a unidirectional rotational stepwise output. The device is particularly designed for altering the directional output of a water sprinkler nozzle.

Linear to rotary motion conversion devices in general are well known in the art and have been used in a wide variety of mechanical machinery applications for many years. One common device of this type comprises a so-called rack having a series of ratchet teeth engageable with a plurality of pawls formed on a rotatable pinion gear. Linear motion of the rack in one direction causes engagement between the ratchet teeth and the pawls to rotatably drive the pinion gear in one direction, whereas linear motion of the rack in an opposite direction causes rotational driving of the pinion gear in an opposite direction.

In many applications, it is desirable to limit conversion of a reciprocating linear input to a unidirectional rotary output. For example, in a lawn sprinkler including a sprinkler nozzle designed for full circle or 360 degree rotation, it is desirable to rotate the nozzle in a single direction of rotation using highly reliable mechanical drive components with a minimum manufacturing cost. In this regard, many prior art linear to rotary motion transmission devices have been proposed for converting linear motion to a unidirectional rotary output. However, these prior art rack and pinion devices have typically comprised relatively complicated mechanical systems requiring lateral movement of the rack out of engagement with the pinion pawls during some portion of operation. See, for example, U.S. Pat. Nos. 557,415; 662,611; 1,316,437; 3,233,472; and 3,924,476. Alternately, prior art rack and pinion systems have included relatively complicated pinion and pawl arrangements such as pivoted spring-loaded pawls, multiple pinion and ratchet combinations, and the like. See, for example, U.S. Pat. Nos. 25,550; 1,171,763; and 1,387,165.

The present invention overcomes the problems and disadvantages of the prior art by providing an improved linear to rotary motion transmission device comprising an inexpensively-formed unitary rack with ratchet teeth for engagement with flexible pawls formed integrally with an inexpensively-formed pinion for driving of the pinion in a single rotational direction.

SUMMARY OF THE INVENTION

In accordance with the invention, a linear to rotary motion transmission device comprises a one-piece rack having a plurality of ratchet teeth. A unitary pinion gear is constrained for rotation about a single axis, and has integrally formed thereon a plurality of radially outwardly angled flexible pawls for engagement with the ratchet teeth of the rack. Reciprocating linear motion of the rack causes driving engagement between the ratchet teeth and the pawls when the rack is driven in one direction, and causes sliding non-driving engagement between the ratchet teeth and the pawls when the rack is driven in an opposite direction. In a preferred embodiment of the invention, the rack includes ratchet teeth for engagement with a plurality of pawls generally on opposite sides of the pinion throughout reciprocal motion of the rack in both directions. In this embodiment, reciprocating linear motion of the rack causes driving interaction between the rack with the pawls on one side of the pinion and simultaneous sliding non-driving interaction between the rack and the pawls on the other side of the pinion.

The linear to rotary motion transmission device of this invention is particularly adapted for use with a sprinkler nozzle for rotatably driving the nozzle through a circular path. More specifically, a reciprocating hydraulic motor is provided for converting line source water pressure to a reciprocating, linear motion. The hydraulic motor output is coupled to the rack for reciprocating the rack to rotatably drive the pinion gear in one rotational direction in a series of regular, intermittent steps. The pinion is connected to the sprinkler nozzle for rotatably carrying the sprinkler nozzle through a circular path.

BRIEF DESCRIPTION OF THE DRAWINGS

The accompanying drawings illustrate the invention. In such drawings:

FIG. 1 is a side elevation illustrating a sprinkler unit including a linear to rotary motion transmission device of this invention, with portions broken away;

FIG. 2 is an enlarged fragmented elevation of the device, with substantial portions broken away;

DETAILED DESCRIPTION OF THE PREFERRED EMBODIMENT

Figure 3:
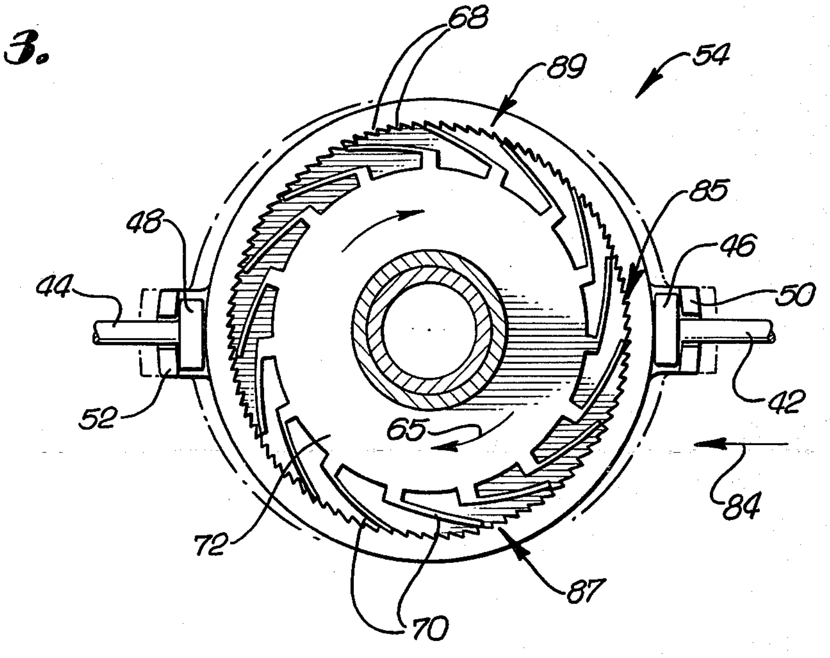
FIG. 3 is a fragmented horizontal section taken on the line 3—3 of FIG. 2.

A sprinkler system 10 is shown in FIG. 1, and generally comprises a standpipe 12 having its upper end threadably connected to the lower end 14 of a sprinkler assembly body 16. The standpipe 12 is suitably connected to a water line source (not shown) for supply of water under pressure to the sprinkler body 16. The sprinkler body carries at its upper end an upwardly extending and laterally outwardly directed nozzle member 18 adapted to receive the water under pressure for spraying the water upwardly and outwardly for irrigation purposes. The nozzle member 18 is rotatably driven as will be described herein for substantially uniform application of irrigation water over a broad area.

The sprinkler body 16 carries a reciprocating hydraulic motor 20 for converting a portion of the incoming water pressure to a reciprocating, linear motion. This reciprocating hydraulic motor 20 includes an inlet tube 22 coupled to the interior of the sprinkler body 16 upstream of the nozzle member 18. The inlet tube 22 communicates water under pressure to a valve body 24 including a pair of outlet ports 25 and 27 coupled respectively to a pair of supply tubes 26 and 28. The supply tubes 26 and 28 are connected respectively to a pair of cylinders 30 and 32 secured with respect to the sprinkler body 16 by a pair of support arms 29 and 31.

A valve member 34 is movably carried within the valve body 24, and is operated by a control lever 36 as will be described in more detail to alternately supply water under pressure through the supply tubes 26 and 28 to the cylinders 30 and 32. More specifically, switching of the lever 36 back and forth as viewed in FIG. 1 serves alternately to couple the cylinder 30 to water under pressure and the cylinder 32 to a suitable drain (not shown) within the valve body 24, and then to couple the cylinder 32 to water under pressure with the cylinder 30 being coupled to the drain. Conveniently, construction details of the lever-actuated valve member 34 and the valve body 24 are relatively conventional in design, whereby the specific structure of the valve member and valve body are not shown or described in detail herein.

The cylinders 30 and 32 respectively carry a pair of pistons 38 and 40 for reciprocation within the cylinders. The pistons 38 and 40 are aligned for reciprocation on a common axis, and are connected to associated piston rods 42 and 44. The two piston rods 42 and 44 extend out of their associated cylinders 30 and 32 radially inwardly toward the nozzle member 18. These piston rods 42 and 44, as shown best in FIGS. 2 and 3, terminate at their inner end in T-shaped bars 46 and 48, respectively received within U-shaped support brackets 50 and 52 formed integrally with a central rack 54. Importantly, the central rack 54 includes a pair of downwardly depending fingers 56 and 58 spaced apart from each other for engaging the control lever 36 of the valve member 34.

In operation, the position of the lever 36 controls the alternate coupling of the supply tubes 26 and 28 to water under pressure, and to the drain. More specifically, the fingers 56 and 58 of the rack 54 engage the control lever 36 to switch the lever back and forth upon reciprocation of the rack 54. As viewed in FIG. 1, the lever 36 is positioned to supply water under pressure through the supply tube 28 to the left-hand cylinder 32, and to couple the cylinder 30 to the drain. This allows the left-hand cylinder 32 to fill with water under pressure to urge the piston 40 therein toward the nozzle member 18. Such motion of the piston 40 also urges the rack 54 to the right to carry the depending finger 58 into contact with the valve lever 36. The finger 36 carries the lever 36 toward the right to switch the position of the valve member 34 such that the left-hand cylinder 32 becomes connected to drain and the right-hand cylinder 30 becomes connected to water under pressure via its supply tube 26. At such time, linear motion of the components reverses to move the valve lever 36 back toward a position to cause re-supply of water under pressure to the left-hand cylinder 32. This reciprocating operation continues as long as water under pressure is supplied to the sprinkler body 16.

The rack 54 is shown in detail in FIGS. 2 and 3. As shown, the rack 54 comprises a cylindrical disk 60, and is formed from a suitable lightweight material such as an injection molded plastic. The disk 60 has an enlarged central opening 62 sized for relatively loose reception about a rotatable pinion 64. The disk opening 62 provides a radial clearance between the disk 60 and the pinion 64 to define the allowable extent of linear reciprocation of the rack with respect to the pinion. Moreover, the rack 54 further comprises an upstanding flange 66 formed integrally about the periphery of the disk 60. The flange 66 has a radially inwardly presented face comprising a plurality of upstanding ratchet teeth 68. These ratchet teeth 68 are provided for engaging a plurality of radially outwardly extending and angled pawls 70 carried at the periphery of a circular plate 72 forming an integral part of the pinion 64. Conveniently, the ratchet teeth 68 are also angled radially for positive driving coaction with the pawls.

The pinion 64 comprising the plate 72 and the pawls 70 is also formed from a suitable lightweight material such as an injection molded plastic or the like. The pawls 70 comprise generally vertically oriented blades extending first radially outwardly, and then turning angularly with respect to the radial direction. The lengths of the pawls 70 are chosen for engagement with the upstanding ratchet teeth 68, and the specific pinion material is chosen such that the plate 72 is relatively rigid and the pawls 70 are somewhat flexible. In this manner, the pawls 70 flex with respect to the ratchet teeth to slide over said teeth to permit relative rotation of the pinion 64 in a rotational direction opposite the direction of angulation of the pawls, as illustrated by arrow 65 in FIG. 3. However, rotational motion in a direction opposite the arrow 65 is prevented by binding engagement of the pawls 70 with the ratchet teeth 68. In this latter direction of rotational motion, the pawls 70 thus engage the ratchet teeth 68 for rotational driving of the pinion 64.

As shown in FIG. 2, the plate 72 is formed integrally with an inner cylinder member having a lower section 74 for rotational mounting within the upper end of the sprinkler body 16, and an upper section 76 for securing to the nozzle member 18. In the embodiment shown, the lower section 74 includes an annular recess 78 aligned with a corresponding recess 80 in the sprinkler body 16. One or more resilient seals 82, such as O-rings, are entrapped within the aligned recesses to secure the pinion 64 for rotation about a vertical axis, and to prevent water leakage between the pinion 64 and the spinkler body 16. The upper section 76 is externally threaded for threaded reception into the lower end of the nozzle member 18, whereby the nozzle member 18 is rotationally driven along with the pinion 64.

In operation, the rack 54 is continuously reciprocated back and forth linearly to rotatably drive the pinion 64 and thereby also rotatably drive the nozzle member 18. More specifically, when the rack 54 is moved linearly toward the pinion 64 as illustrated by the arrow 84 in FIG. 3, a plurality of the pawls 70 in the vicinity indicated by arrow 85 are compressed or deflected radially inwardly toward the pinion plate 72 to accommodate rack reciprocation. This movement of the rack 54 enables a portion of the ratchet teeth 68 on one side of the pinion 64 as indicated at arrow 87 to bindingly or drivingly engage the pawls 70 to rotate the pinion in the direction of arrow 65. At the same time, ratchet teeth 68 on the opposite side of the pinion 64 as indicated at arrow 89 move in a direction to cause the associated pawls 70 to flex slightly whereby those pawls 70 and ratchet teeth 68 rotate relative to each other in non-driving engagement. When rack motion reverses, driving and sliding engagement between the rack teeth 68 and the pawls 70 on opposite sides of the pinion 64 also reverses to once again drive the pinion in the same direction of rotation. In this manner, the pinion and the nozzle member 18 are together rotated in a series of relatively small angular steps in a single rotational direction, with the angular displacement per step being related to the linear displacement of the rack 54 each stroke.

Figure 4:
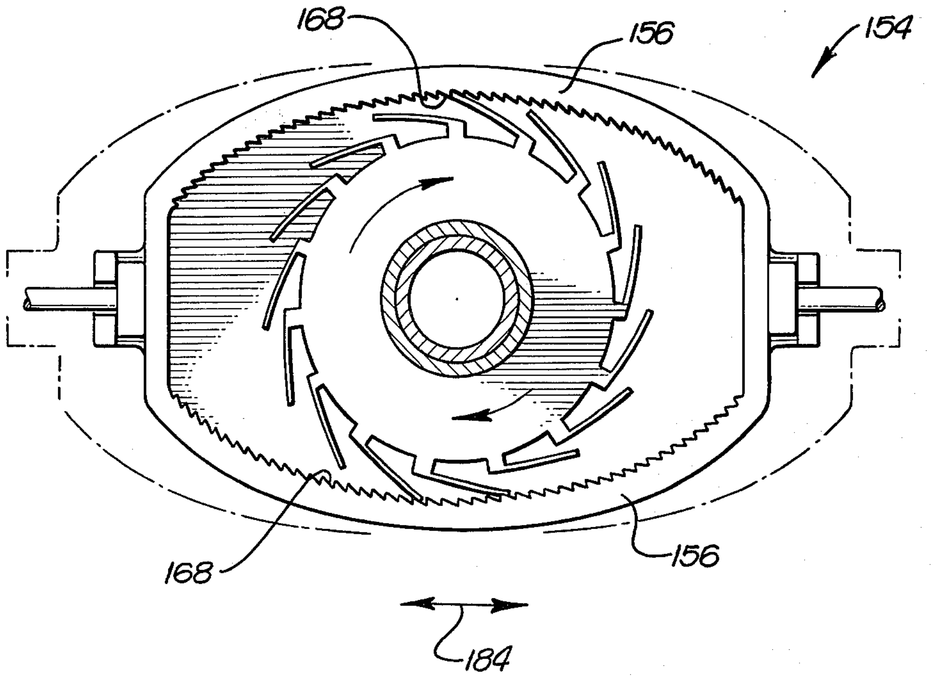
FIG. 4 is a fragmented horizontal section similar to FIG. 3 illustrating an alternate embodiment of the invention.

An alternate embodiment of the invention is shown in FIG. 4, with like components being referred to with common reference numerals. As illustrated in FIG. 4, a modified rack 154 is provided including a pair of generally opposed, arcuate rack sections 156 each having a plurality of ratchet teeth 168 presented radially inwardly for engagement with the flexible pawls 70 of the pinion 72. In this embodiment, the ratchet teeth 168 of the rack sections 156 are disposed generally along a path tangential with the pawls 70 for engagement of a plurality of pawls over substantial arcuate portions of the pinion on opposite sides of the pinion.

In the embodiment of FIG. 4, reciprocation of the rack as illustrated by arrow 184 causes rotation of the pinion 64 in the same manner described with respect to the previous embodiment. Regardless of the direction of reciprocation, the pawls 70 engage the ratchet teeth 168 of one of the rack sections 156, and slide with respect to the ratchet teeth of the other rack section 156. However, in this embodiment, the pinion is rotated in a series of relatively large angular steps because the rack sections 156 are movable through a substantial linear path with respect to the pinion 64.

A wide variety of modifications and improvements of the linear to rotary motion transmission device of this invention are believed to be possible to one skilled in the art. For example, a variety of configurations of racks and ratchet teeth can be applied to variously configured flexible pawls to obtain a unidirectional rotational output from an applied reciprocating linear input. Moreover, the embodiments shown herein may be modified by a reversal by forming the flexible pawls on the linear reciprocated component for engagement with ratchet teeth on the rotatable component. Accordingly, no limitation on the invention is intended except by way of the appended claims.

I claim:

1. A linear to rotary motion transmission device, comprising:

a rotatable pinion having engageable driven means formed integrally thereon; and a reciprocating member having drive means formed integrally thereon for engagement with said driven means on opposite sides of said pinion, one of said drive and driven means comprising a plurality of ratchet teeth, and the other of said drive and driven means comprising a plurality of flexible pawls engageable with a plurality of said ratchet teeth at each of said opposite sides of said pinion for alternating driving engagement between said pawls and teeth on one side of said pinion and sliding non-driving engagement between said pawls and teeth on the other side of said pinion throughout reciprocation of said reciprocating member.

2. The device of claim 1 wherein said drive means comprises said plurality of ratchet teeth, and wherein said driven means comprises said plurality of flexible pawls.

3. The device of claim 1 wherein said pawls each extend generally radially and angularly with respect to said pinion.

4. The device of claim 1 wherein said reciprocating member and said pinion are each formed from a relatively lightweight plastic.

5. The device of claim 1 wherein said reciprocating member comprises a generally annular member received about said pinion for reciprocation with respect thereto with said ratchet teeth in engagement with said flexible pawls.

6. The device of claim 1 wherein said reciprocating member comprises a pair of generally opposed, arcuately extending members disposed on opposite sides of said pinion, and including means for reciprocating said pair of arcuate members together with respect to said pinion with said ratchet teeth in engagement with said flexible pawls.

7. The device of claim 5 or 6 wherein said drive means comprises said ratchet teeth formed on said reciprocating member and presented toward said pinion, and wherein said driven means comprises said pawls each extending generally radially outwardly and angularly from the circumference of said pinion for engagement with said ratchet teeth.

8. A linear to rotary motion transmission device, comprising:

a rotatable pinion having a plurality of radially and angularly extending flexible pawls formed integrally thereon; and a reciprocating member having a plurality of ratchet teeth formed thereon for engagement with a plurality of said pawls on each of opposite sides of said pinion for alternating driving engagement between said pawls and teeth on one side of said pinion and sliding non-driving engagement between said pawls and teeth on the other side of said pinion throughout reciprocation of said reciprocating member.

9. The device of claim 8 wherein said pinion and pawls are integrally formed from a lightweight plastic, and wherein said reciprocating member and ratchet teeth are integrally formed from a lightweight plastic.

10. The device of claim 8 wherein said reciprocating member comprises a generally annular member received about said pinion for reciprocation with respect thereto with said ratchet teeth in engagement with said flexible pawls.

11. The device of claim 8 wherein said reciprocating member comprises a pair of generally opposed, arcuately extending members disposed on opposite sides of said pinion, and including means for reciprocating said pair of arcuate members together with respect to said pinion with said ratchet teeth in engagement with said flexible pawls.

12. A linear to rotary motion transmission device, comprising:

a reciprocating member;

a rotatable member;

a plurality of ratchet teeth on one of said reciprocating and rotatable members; and a plurality of flexible pawls formed integrally on the other of said reciprocating and rotatable members for driving engagement between a plurality of said pawls and said ratchet teeth upon reciprocation of said reciprocating member in one direction, and for sliding non-driving engagement with said ratchet teeth upon reciprocation of said reciprocating member in an opposite direction.

13. The device of claim 12 wherein said rotatable member comprises a pinion, and wherein said reciprocating member includes means formed generally on opposite sides of said pinion and having thereon said one of said pawls and ratchet teeth, whereby said pawls are in engagement with said ratchet teeth generally on opposite sides of said pinion for alternating driving engagement between said pawls and teeth on one side of said pinion and sliding non-driving engagement between said pawls and teeth on the other side of said pinion throughout reciprocation of said reciprocating member.

14. A sprinkler assembly, comprising:

a sprinkler body;

a pinion mounted on said body for rotation about a fixed axis, said pinion having engageable driven means formed thereon;

a nozzle member rotatable with said pinion; and motor means driven by liquid flowing through said sprinkler body for reciprocating a reciprocating output member having drive means formed thereon for engagement with said driven means on opposite sides of said pinion, one of said drive and driven means comprising a plurality of ratchet teeth, and the other of said drive and driven means comprising a plurality of flexible pawls engageable with said ratchet teeth for alternating driving engagement between said pawls and teeth on one side of said pinion and sliding non-driving engagement between said pawls and teeth on the other side of said pinion throughout reciprocation of said reciprocating member.

15. The assembly of claim 14 wherein said drive means comprises said plurality of ratchet teeth, and wherein said driven means comprises said plurality of flexible pawls.

16. The assembly of claim 14 wherein said reciprocating member is formed integrally with said drive means, and wherein said pinion is formed integrally with said driven means.

17. The assembly of claim 16 wherein said reciprocating member and said pinion are each formed from a relatively lightweight plastic.

18. The assembly of claim 14 wherein said reciprocating member comprises a generally annular member received about said pinion for reciprocation with respect thereto with said ratchet teeth in engagement with said flexible pawls.

19. The assembly of claim 14 wherein said reciprocating member comprises a pair of generally opposed, arcuately extending members disposed on opposite sides of said pinion, and including means for reciprocating said pair of arcuate members together with respect to said pinion with said ratchet teeth in engagement with said flexible pawls.

20. The assembly of claim 18 or 19 wherein said drive means comprises said ratchet teeth formed on said reciprocating member and presented toward said pinion, and wherein said driven means comprises said pawls each extending generally radially outwardly and angularly from the circumference of said pinion for engagement with said ratchet teeth.

21. The assembly of claim 14 wherein said motor means includes lever means movable for switching the direction of reciprocation of said reciprocating member, said reciprocating member including means carried therewith engageable with said lever means for controlling the position of said lever means for controlling the direction of reciprocation of said reciprocating member.

22. A sprinkler assembly, comprising:

a sprinkler body a pinion mounted for rotation on said sprinkler body about a fixed axis and including a plurality of radially and angularly extending flexible pawls;

a nozzle member mounted on said pinion for rotation therewith; and motor means driven by liquid flowing through said sprinkler body for reciprocating a reciprocating output member having a plurality of ratchet teeth formed thereon for engagement with a plurality of said pawls on each of opposite sides of said pinion for alternating driving engagement between said pawls and teeth on one side of said pinion and sliding non-driving engagement between said pawls and teeth on the other side of said pinion throughout reciprocation of said reciprocating member.

23. The device of claim 22 wherein said motor means includes lever means movable for switching the direction of reciprocation of said reciprocating member, said reciprocating member including means carried therewith engageable with said lever means for controlling the position of said lever means for controlling the direction of reciprocation of said reciprocating member.

24. The device of claim 22 wherein said reciprocating member comprises a generally annular member received about said pinion for reciprocation with respect thereto with said ratchet teeth in engagement with said flexible pawls.

25. The device of claim 22 wherein said reciprocating member comprises a pair of generally opposed, arcuately extending members disposed on opposite sides of said pinion, and including means for reciprocating said pair of arcuate members together with respect to said pinion with said ratchet teeth in engagement with said flexible pawls.

26. A sprinkler assembly, comprising:

a sprinkler body;

a pinion mounted on said body for rotation about a fixed axis, said pinion having engageable driven means formed thereon;

a nozzle member rotatable with said pinion;

a reciprocating member mounted for reciprocation with respect to said pinion, said reciprocating member having drive means formed thereon for engagement with said driven means on opposite sides of said pinion, one of said drive and driven means comprising a plurality of ratchet teeth, and the other of said drive and driven means comprising a plurality of flexible pawls engageable with said ratchet teeth for alternating driving engagement between said pawls and teeth on one side of said pinion and sliding non-driving engagement between said pawls and teeth on the other side of said pinion throughout reciprocation of said reciprocating member; and means for reciprocally driving said reciprocating member with respect to said pinion.

27. The assembly of claim 26 wherein said driving means comprises motor means driven by liquid flowing through said sprinkler body.

* * * * *

UNITED STATES PATENT AND TRADEMARK OFFICE

CERTIFICATE OF CORRECTION

PATENT NO. : 4,335,853

DATED : June 22, 1982

INVENTOR(S) : Robert S. Szemeredi and Edward M. Troup

It is certified that error appears in the above—identified patent and that said Letters Patent is hereby corrected as shown below:

On the title page after INID Code Number [73] Assignee:, delete "Lyntone Engineering, Inc., Glendora, Calif." and insert therefor --Rain Bird Consumer Mfg. Corp., Duarte, Calif.--

Signed and Sealed this

*Second* Day of *November 1982*

[SEAL]

*Attest:*

GERALD J. MOSSINGHOFF

*Attesting Officer* *Commissioner of Patents and Trademarks*